Aug. 31, 1954
A. C. SCINTA
2,687,544
WINDSHIELD CLEANER
Filed May 10, 1950
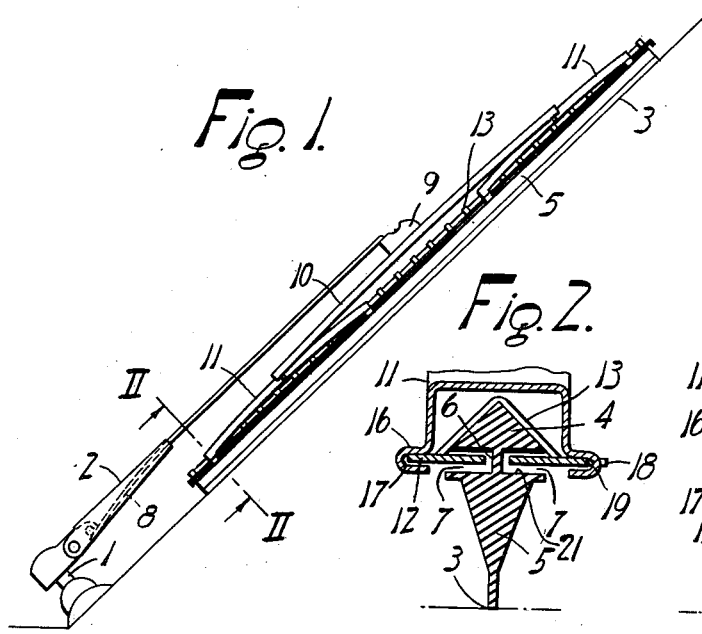
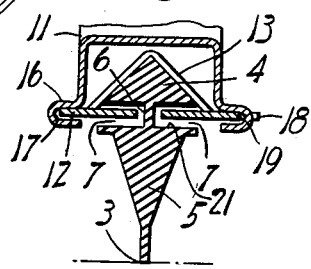
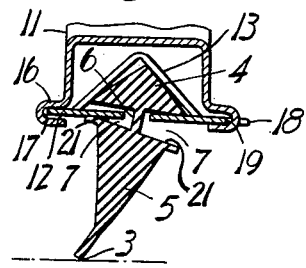
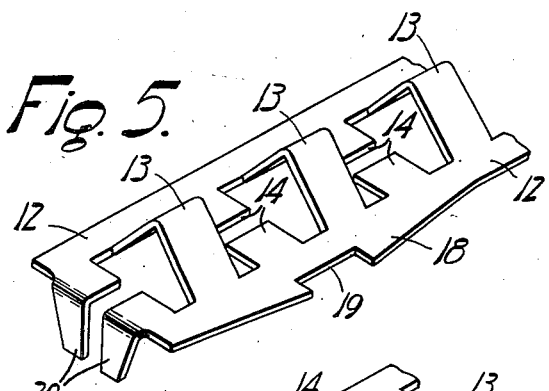
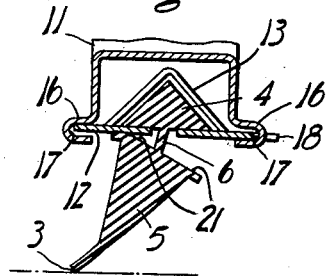
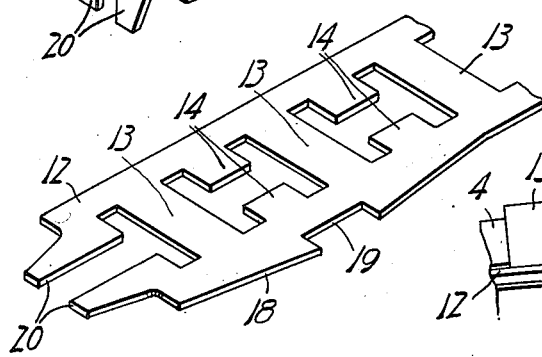
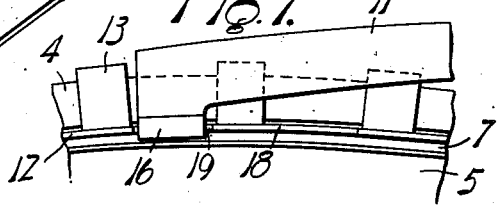
INVENTOR.
Anthony C. Scinta
BY
Bean, Brooks, Buckley & Bean.
ATTORNEYS Patented Aug. 31, 1954

2,687,544

UNITED STATES PATENT OFFICE 2,687,544

WINDSHIELD CLEANER

Anthony C. Scinta, Buffalo, N. Y., assignor to Trico Products Corporation, Buffalo, N. Y.

Application May 10, 1950, Serial No. 161,086

11 Claims. (Cl. 15—245)

This invention relates to a windshield cleaner and more particularly to the wiping blade which during operation is moved back and forth across the field of vision on the windshield glass. The modern automobile is now provided with a curved windshield, and consequently the wiping blade has been made flexible in an effort to enable proper conformance of the wiping edge to the glass surface in order to effect a clean wipe.

The object of the present invention is to provide an improved wiper in which the rubber or squeegee element is given ample freedom of movement for more readily adjusting itself to the curvature of the surface and is also afforded an easy rocking action on its wiping edge at the beginning of each stroke to assume the proper dragging angle for most effectively accomplishing the wiping action.

A further object of the invention is to provide a flexible wiping blade with a novel holder in which the squeegee element is given cradled support in its holder for adjusting itself therein to more effectively transmit the arm applied wiping pressure to the wiping edge.

Again, the invention resides in a novel wiper structure in which the squeegee holder is shaped to increase its flexibility and to provide greater torque resistance.

The foregoing and other objects will manifest themselves as the following description progresses, reference being had to the accompanying drawing, wherein Fig. 1 is a side elevation showing the improved wiper in use;

Fig. 2 is a cross sectional view about on line 2—2 of Fig. 1;

Figs. 3 and 4 are similar sectional views illustrating the action of the squeegee in use;

Fig. 5 is a fragmentary perspective view of the shaped holder;

Fig. 6 is a like view of the stamping of blank from which the holder is shaped; and Fig. 7 is a fragmentary enlarged view depicting the action of the holder in use.

Referring more particularly to the drawing, the numeral 1 designates the wiper actuating shaft, and 2 the wiper carrying arm which is oscillated thereby for moving the wiper back and forth upon the windshield which latter may be either curved or flat.

The wiper comprises a holder and a squeegee element of rubber or other suitable material. As illustrated, the squeegee is generally of strip-like form and has a wiping edge 3 along one longitudinal margin and an enlarged anchoring bead or head 4 of triangular cross section along its opposite margin. The wiping edge is formed at the lower apex of an inverted triangular shaped body portion 5 which is joined to the anchoring bead by a reduced neck 6. Therefore, the neck extends between and connects the broad opposing flat base faces of the triangular parts 4 and 5 to provide the opposite sides of the squeegee with longitudinal shoulders or seats 21. The wiper arm 2 is of a well known construction and has a spring 8 for exerting a wiping pressure on the wiper or wiping blade to which it is attached at its outer end by a clip or attaching device 9.

A pressure distributing structure or frame by which the arm applied pressure is distributed to the blade at longitudinally spaced points, herein consists of a primary yoke 10, carrying the attaching device 9, and a pair of secondary yokes 11, each pivotally connected to an end of the primary yoke.

The holder comprises a pair of pressure receiving side bars or rails 12 and a plurality of connecting cross straps 13 joining the inner edges of the rails but being upwardly arched over the back of the anchoring enlargement to provide in effect an inverted cradle support for the like shaped back surface of the bead 4. This arrangement disposes the rails laterally of the straps for being embraced by the secondary yokes. Alternating with the cross straps are pairs of opposed retaining fingers 14 which are carried by the side rails 12 and engage the undersides of the anchoring bead short of the neck 6. The fingers loosely confine the bead in its cradle with sufficient clearance in the oppositely facing neck-forming grooves 7 to enable the bead to be freely floating and nesting in the inverted seat as provided by cross straps 13. In turn, the arched cross straps may nest upwardly into the downwardly facing channels of the yokes 10 and 11.

The opposite ends of the secondary yokes are bifurcated to straddle the holder, such straddling parts 16 being shaped to form opposed seats 17 for receiving and sliding along the side rails upon relative longitudinal movement. One side rail has a beveled edge 18 leading up to a keeper notch or recess 19 for engagement by the adjacent straddling part 16 to retain the holder in position while still permitting it to flex. To disengage the holder the side rails may be sprung together. While the straddling parts 16 slidably support the rails there is ample clearance above the cross straps for them to move as the blade flexes. This construction places the pressure receiving side rails in a plane beneath and on opposite sides of the bead so that the squeegee is saddled by the holder. Therefore, the straddling parts 16 will apply the arm pressure to the side rails at this lower level for transmission by the cross straps to the squeegee element by a downward pull which tends to stabilize the squeegee upon its wiping edge and facilitates the initial rocking thereupon. With this cradled support there is less tendency for the squeegee to twist or roll. This also provides an arrangement in which the bead readily centers itself in the inverted V-seat of the cradle, Fig. 2, as the squeegee rocks on its wiping edge at the start of each stroke. Thereafter the squeegee will assume a rearwardly inclined or dragging position for wiping action, as shown in Fig. 3, wherein the anchoring bead is tilted, or is under a heavier arm pressure. When the wiper clings abnormally to the glass, the bead may be pulled down into flat engagement with the retaining fingers 14, as depicted in Fig. 4. The arm pressure is applied to the squeegee element at closely arranged points by the cross straps which alternate with the retaining fingers 14 to which latter the lateral support is transferred alternately from the cross straps. The anchoring bead will freely centralize itself within the cradle at the start of each stroke and therefrom will assume its wiping position to insure the correct angle of drag for the wiping edge.

The holder may be readily stamped from sheet metal stock to form a blank, as indicated in Fig. 6, the same having a series of H-shaped slots to provide the cross straps 13 and the retaining fingers 14. The blank is then shaped to arch the cross straps and complete the holder, as in Fig. 5. This gives an arched cross sectional shape to the framework of the holder which strengthens the same and offers torque resistance while permitting an easy flexing to the holder frame. The arching of the cross straps imparts a channeled form to the holder but nevertheless it is flexible.

The rubber squeezee element is introduced into the holder, by sliding the anchoring head 4 lengthwise beneath the cross straps 13 and engaging the retaining fingers 14 in the side grooves 7. The squeegee is secured in place within the holder by turning downwardly the tabs 20 at the opposite ends of the pressure receiving bars 12. The blank is preferably stamped from resilient stock and therefore the side bars will be flexible and joined by arched cross straps 13 of a resilient nature. This will enable the side bars at one end being sprung inwardly to engage and disengage the recess 19 from its seat 17.

A blade embodying the present invention provides a light holder frame of durable, torque resisting construction which is capable of readily flexing with the squeegee. Furthermore, the rubber element 4, 5 is loose within the holder for freely conforming to the windshield surface under the arm pressure as applied to the back edge of the squeegee. The side grooves 7 provide ample clearance for the body 5 to freely rock unrestrained to its wiping position. The arm pressure is applied to the side bars in a plane below the back edge of the squeegee and closer to the glass surface and is transmitted by the saddle or cross straps to the back of the squeegee in a manner to exert a downward pull therefrom. As the blade is reciprocated upon the windshield surface, the body portion 5 of the squeegee will swing upon the neck 6 to assume the desired position for wiping, the extent of swing being limited by contact of the shoulders 21 with the retaining fingers 14. As the wiping edge of the blade follows the changes in contour of the windshield surface, the side bars 12 will flex and result in the cross straps 16 moving toward and from each other with a motion lengthwise of the blade, and since the cross straps will have a tendency to embed themselves within the yieldable anchoring bead, it is apparent that the relative movement between the cross straps will tend to exert an influence on the squeegee body lengthwise thereof serving to distend or contract the body of rubber by way of assistance to the surface conforming action.

The flexibility of the channeled holder is the result of the cross strap formation which in effect provides a series of clearance spaces between the straps. The pressure receiving side rails are flexible and disposed outwardly of the cross straps which enables the holder being slid lengthwise in the seats 17 of the secondary yokes. The cross straps may be curved upwardly, if desired, although the illustrated form provides an angular seat at the apices into which the anchoring bead tends to nest.

While the foregoing description has been given in detail it is without thought of limitation since the inventive principles involved are capable of assuming other physical embodiments without departing from the spirit of the invention and the scope of the appended claims.

What is claimed is:

1. A windshield wiping blade comprising a squeegee body element having an anchoring bead along its back edge, and a flexible channeled holder inverted over the anchoring bead and comprising coplanar arm pressure receiving rails flexing in conformance to the wiped surface at the opposite sides of the anchoring bead, and torque resisting cross straps integrally joined to the inner edges of the rails and arched upwardly over the anchoring head.

2. A windshield wiper comprising a wiping blade having a squeegee with an anchoring bead along its back edge, a holder for the squeegee loosely embracing the anchoring bead and having side bars extending lengthwise thereof at the opposite sides of the bead and joined by cross straps to overlie the anchoring bead pressure applying cross straps extending upwardly from the bars and over the bead at intervals, and retaining fingers extending inwardly from the side bars and loosely engaging beneath the bead to confine the latter rockably beneath the cross straps.

3. A windshield wiper comprising an elongate squeegee body having an anchoring bead along its back edge joined by a reduced neck to the body, and a channeled holder for the squeegee comprising coplanar pressure receiving side rails flexible in conformance to the wiped surface and joined at intervals by rail supporting cross straps, said straps being arched upwardly over the anchoring bead to provide a torque resisting support for the side rails on the underface portions of which latter the squeegee body may rock, said cross straps acting to brace the side rails apart against relative inward movement toward each other, and retaining marginal portions on the side rails extending inwardly beneath the anchoring bead to confine the latter within the arched cross straps.

4. A windshield wiping blade comprising an elongate squeegee body having an anchoring bead along its back edge, and a channeled holder for the squeegee comprising pressure receiving side rails flexible in conformance to the wiped surface and joined at intervals by pressure applying cross straps, said straps being arched upwardly over the anchoring bead to form a cradle support therefor in which the squeegee may rock, and retaining fingers carried by the side rails and extending inwardly beneath the anchoring bead to confine the latter in its cradle support, said fingers being arranged in the spaces between the cross straps and cooperating therewith to provide lateral support for the squeegee, said holder with its rails supporting the straps and fingers constituting a one-piece stamping.

5. A windshield wiping blade comprising an elongate squeegee body having an anchoring bead along its back edge, and a channeled holder for the squeegee comprising coplanar pressure receiving side rails flexible in conformance to the wiped surface and joined at intervals by pressure applying cross straps, said straps being arched upwardly over the anchoring bead to form a cradle support therefor in which the squeegee may rock, and retaining fingers carried by the side rails and extending inwardly beneath the anchoring bead to confine the latter in its cradle support, the squeegee having a reduced neck portion extending out from the cradle support and between the retaining fingers and supporting a wiping body portion.

6. A windshield wiping blade comprising a squeegee body having an anchoring bead along its back edge, and a channeled holder for the squeegee comprising coplanar pressure receiving rails flexing in conformance to the wiped surface at the opposite sides of the anchoring bead and joined at intervals by pull-exerting cross straps arched upwardly over the bead in supporting contact therewith, the cross straps joining to the inner edges of the side rails, and retaining fingers extending from such inner edges and terminating beneath the anchoring bead.

7. A channeled holder for a windshield wiping squeegee, said holder comprising a one-piece frame flexible to conform to the surface being wiped and having elongate pressure receiving side rails coplanar and joined at intervals by torque resisting cross straps arched upwardly over the back edge of such a squeegee, with opposing sets of squeegee-supporting fingers extending inwardly from the inner edges of the pressure-receiving side rails.

8. A windshield wiping blade comprising an elongate squeegee body having an anchoring bead along its back edge, and a channeled holder for the squeegee comprising coplanar pressure receiving side rails flexible in conformance to the wiped surface and joined at intervals by pressure applying cross straps, said straps being arched upwardly over the anchoring bead to form a cradle support therefor in which the squeegee may rock, and retaining fingers carried by the side rails and extending inwardly beneath the anchoring bead to confine the latter in its cradle support, the squeegee having a reduced neck portion extending out from the cradle support and between the retaining fingers and supporting a wiping body portion, the body portion having lateral shoulders alternately engageable with the underside of the retaining fingers to limit the lateral rocking of such body portion.

9. A windshield wiping blade comprising an elongate squeegee body having an anchoring bead along its back edge, and a channeled holder for the squeegee comprising coplanar pressure receiving side rails flexible in conformance to the wiped surface and joined at intervals by pressure applying cross straps, said straps being arched upwardly over the anchoring bead to form a cradle support therefor in which the squeegee may rock, and retaining fingers carried by the side rails and extending inwardly beneath the anchoring bead to confine the latter in its cradle support, the squeegee having a reduced neck portion extending out from the cradle support and between the retaining fingers and supporting a wiping body portion, said squeegee being longitudinally displaceable from the cradle support, with said side rails having stop parts securing the squeegee against unauthorized displacement.

10. A windshield wiper according to claim 3, wherein pressure applying means are connected to the side rails and including a channeled yoke having its channel facing the arched cross straps, the upper portions of the adjacent cross straps being receivable within the yoke channel.

11. A channeled holder for a windshield wiping squeegee according to claim 7, wherein said cross straps are connected to the side rails inwardly of their outer margins to leave the latter unobstructed by said cross straps for free sliding engagement by a pressure applying means.

References Cited in the file of this patent

UNITED STATES PATENTS

| Number | Name | Date |
|---|---|---|
| 1,706,053 | Bussinger | Mar. 19, 1929 |
| 1,853,715 | Anderson | Apr. 12, 1932 |
| 2,149,037 | Zaiger | Feb. 28, 1939 |
| 2,311,783 | Siegling | Feb. 23, 1943 |
| 2,343,827 | Beckwith | Mar. 7, 1944 |
| 2,484,288 | Hamm | Oct. 11, 1949 |
| 2,548,090 | Anderson | Apr. 10, 1951 |
| 2,596,063 | Anderson | May 6, 1952 |

OTHER REFERENCES

The Anderson Co., Gary, Indiana, catalog effective Nov. 1, 1946, pages 2 and 3. (Copy in Div. 27.)